(12) United States Patent
Nojiri

(10) Patent No.: US 11,479,088 B2
(45) Date of Patent: Oct. 25, 2022

(54) GLASS RUN

(71) Applicant: TOYODA GOSEI CO., LTD., Kiyosu (JP)

(72) Inventor: Masatoshi Nojiri, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 219 days.

(21) Appl. No.: 16/934,522

(22) Filed: Jul. 21, 2020

(65) Prior Publication Data

US 2021/0031599 A1   Feb. 4, 2021

(30) Foreign Application Priority Data

Aug. 2, 2019   (JP) .............................. JP2019-142714

(51) Int. Cl.
*B60J 5/04*   (2006.01)
*B60J 10/50*   (2016.01)
*B60J 10/76*   (2016.01)

(52) U.S. Cl.
CPC .............. *B60J 5/0402* (2013.01); *B60J 10/50* (2016.02); *B60J 10/76* (2016.02)

(58) Field of Classification Search
CPC ........... B60J 5/0402; B60J 10/50; B60J 10/76
See application file for complete search history.

(56) References Cited

U.S. PATENT DOCUMENTS

| | | | | |
|---|---|---|---|---|
| 8,689,489 B2* | 4/2014 | Mine | ........................ | B60J 10/76 49/490.1 |
| 9,096,114 B2* | 8/2015 | Baratin | .................... | B60J 10/76 |
| 9,186,964 B2* | 11/2015 | Im | .......................... | B60J 5/0405 |
| 9,623,739 B2* | 4/2017 | Fukuta | ..................... | B60J 10/74 |
| 9,694,660 B2* | 7/2017 | Kameoka | ................. | B60J 10/74 |
| 9,845,000 B2* | 12/2017 | Kojima | .................... | B60J 5/0402 |
| 10,583,726 B2* | 3/2020 | Nishikawa | ............. | B60J 10/265 |
| 10,603,996 B2* | 3/2020 | Mizutani | .................. | B60J 10/50 |
| 11,117,455 B2* | 9/2021 | Roux | ....................... | B60J 10/32 |
| 11,299,022 B2* | 4/2022 | Blottiau | ................... | B60J 10/76 |
| 2012/0079772 A1* | 4/2012 | Mine | ........................ | B60J 10/76 49/490.1 |
| 2013/0305612 A1* | 11/2013 | Murree | .................... | B60J 10/16 49/489.1 |
| 2018/0266173 A1* | 9/2018 | Mizutani | .................. | B60J 10/76 |
| 2018/0290526 A1* | 10/2018 | Nishikawa | ............. | B60R 13/06 |
| 2021/0354538 A1* | 11/2021 | Miyata | .................... | B60J 10/76 |

FOREIGN PATENT DOCUMENTS

JP   2016-222232 A   12/2016
JP   2018-149984 A   9/2018

* cited by examiner

*Primary Examiner* — Jason S Morrow
(74) *Attorney, Agent, or Firm* — Posz Law Group, PLC

(57) ABSTRACT

A glass run attached to a groove formed in a door frame includes: a basic frame including a bottom wall, a vehicle exterior side wall, and a vehicle interior side wall; an outer lip provided on the vehicle exterior side wall and coming into sliding contact with the vehicle exterior side of door glass; and an inner lip provided on the vehicle interior side wall and coming into sliding contact with the vehicle interior side of the door glass. The inner lip includes at least a first inner lip, and a second inner lip provided at a position closer to the bottom wall than the first inner lip is. Each of the first inner lip and the second inner lip extends toward the bottom wall, and does not come into contact with each other during sliding contact with the door glass.

4 Claims, 5 Drawing Sheets

GLASS RUN

BACKGROUND OF THE INVENTION

(1) Field of the Invention

The present invention relates to a glass run attached to a door frame provided on a door of a vehicle.

(2) Description of Related Art

FIG. 1 shows a front view of a front door 100 on the left side of an automobile as viewed from the outside of the vehicle. A door frame 310 is mounted on an upper portion of a door body 210 constituting the front door 100, and a window opening is formed by the door frame 310 and an upper edge of the door body 210. A glass run 110 is mounted on an inner peripheral edge of the window opening and inside the door body 210 to guide up-and-down movement of the door glass 600.

FIG. 8 shows a vertical cross section (X-X cross section in FIG. 1) of a vertical frame portion of the door frame 310. The glass run 110 has a channel shape (C-shaped cross section), and has a basic frame constituted by a bottom wall 200, a vehicle exterior side wall 300, and a vehicle interior side wall 400. A first outer lip 330 coming into sliding contact with the door glass 600 is formed integrally with a tip of the vehicle exterior side wall 300. In addition, a second outer lip 340 is disposed on the vehicle interior side of the vehicle exterior side wall 300 at a position closer to the bottom wall 200 than the first outer lip 330 is. The second outer lip 340 protrudes toward the bottom wall 200 and comes into sliding contact with the door glass 600.

An inner lip 410 coming into sliding contact with the door glass 600 is formed integrally with a tip of the vehicle interior side wall 400. Moreover, a sub-lip 420 protruding in a direction opposite to the inner lip 410 and extending toward the vehicle exterior side is disposed on the vehicle exterior side of the vehicle interior side wall 400 at a position closer to the bottom wall 200 than the inner lip 410 is. The vehicle interior side of the inner lip 410 comes into contact with the sub-lip 420 as the door glass 600 rises. Furthermore, a cover lip 430 formed at a tip of the vehicle interior side wall 400 extends from the tip of the vehicle interior side wall 400 in such a manner that a vehicle interior side frame of the door frame 310 is sandwiched between the cover lip 430 and the vehicle interior side wall 400 (JP 2018-149984 A).

Meanwhile, as shown in FIG. 8, sound propagation routes from the outside of the vehicle to the vehicle interior include a glass transmission route A for transmission through the door glass 600, and a glass run transmission route B for transmission through the glass run 110. In recent years, the glass run transmission route B has become remarkable concerning the door glass 600 along with reduction of sound transmitted through the door glass 600 as a result of improvement of NV (Noise, Vibration) characteristics of glass such as laminated glass. Furthermore, during traveling with an electric motor such as traveling by an electric vehicle or a hybrid vehicle, entire quietness increases. It is therefore demanded to improve transmitted sound insulation in the glass run transmission route B.

For example, JP 2016-222232 A shown in FIG. 9 is known as a technique for sound insulation in a glass run. Note that parts in FIG. 9 common to those in JP 2018-149984 A described above are given identical names and reference numerals. JP-A-2016-222232 discloses a glass run 110 which has a channel shape (substantially "U"-shaped cross section) and has a basic frame constituted by a vehicle exterior side wall 300 fitted along a door frame 310 of a vehicle and guiding a door glass 600 to a groove, a vehicle interior side wall 400 having a cross-sectional shape longer than that of the vehicle exterior side wall 300, and a bottom wall 200 connecting the vehicle exterior side wall 300 and the vehicle interior side wall 400. The glass run 110 includes an outer lip 350 and an inner lip 410 in sliding contact with the door glass 600, a lip 440 protruding toward the bottom wall 200 from the vehicle exterior side of the vehicle interior side wall 400 at a position closer to the bottom wall 200 than the inner lip 410 is, and a cover lip 430 extending from an end of the vehicle interior side wall 400 in such a manner that a vehicle interior side frame portion (vehicle interior side frame) of the door frame 310 is sandwiched between the cover lip 430 and the vehicle interior side wall 400. A sound insulation wall 500 protrudes from at least an end of the vehicle interior side wall 400.

A recessed space M1 formed between the sound insulation wall 500 and a vehicle interior side surface of the door glass 600 is closed by providing a gap S in a range from 0 mm to 1 mm (inclusive) between a tip of the sound insulation wall 500 and the door glass 600 without elastic contact with the door glass 600 to insulate sound. A sound insulation effect herein increases as the gap S is narrower.

SUMMARY OF THE INVENTION

The gap S between the tip of the sound insulation wall 500 and the door glass 600 is narrow in the technique of JP 2016-222232 A. In this case, the tip of the sound insulation wall 500 strikes the door glass 600 when the entire door glass 600 is vibrated or displaced. This condition produces a new noise source.

For solving the aforementioned problems, a first embodiment of the present invention is directed to a glass run attached to a groove formed in a door frame. The glass run includes: a basic frame including a bottom wall, a vehicle exterior side wall, and a vehicle interior side wall; an outer lip provided on the vehicle exterior side wall and coming into sliding contact with the vehicle exterior side of door glass; and an inner lip provided on the vehicle interior side wall and coming into sliding contact with the vehicle interior side of the door glass. The inner lip includes at least a first inner lip, and a second inner lip provided at a position closer to the bottom wall than the first inner lip is. Each of the first inner lip and the second inner lip extends toward the bottom wall, and does not come into contact with each other during sliding contact with the door glass.

According to the first embodiment of the present invention, the glass run includes at least the first inner lip, and the second inner lip formed at a position closer to the bottom wall than the first inner lip is. In the configuration where the plurality of inner lips are provided, a transmitted sound insulation effect in the glass run transmission route B increases.

In addition, in the configuration where the plurality of inner lips are provided, each length of the inner lips can be made smaller than a length of a conventional inner lip. Accordingly, a resonance point of the transmitted sound can be shifted to the high frequency side to prevent vibrations of each inner lip produced by the transmitted sound. As a result, generation of radiated sound by vibrations is avoidable on the vehicle interior side.

Furthermore, the first inner lip and the second inner lip extend toward the bottom wall, and do not contact each other during sliding contact with the door glass. Accordingly, the first inner lip and the second inner lip do not interfere with each other, thereby allowing smooth sliding contact of the door glass, and maintaining sealing performance of the inner lips for the door glass.

A second embodiment of the present invention is directed to a glass run, wherein a sub-lip that obliquely protrudes from a first inner lip side root portion of the second inner lip or the vehicle interior side wall toward a root portion side surface of the first inner lip is provided between the first inner lip and the second inner lip. According to the second embodiment of the present invention, the sub-lip that obliquely protrudes from the first inner lip side root portion of the second inner lip or the vehicle interior side wall toward the root portion side surface of the first inner lip is provided between the first inner lip and the second inner lip. The sub-lip thus added increases the transmitted sound insulation effect. Moreover, the sub-lip pushes a back surface of the first inner lip and thus increases a pressure contact force applied by the first inner lip to the door glass when the first inner lip comes into sliding contact with the door glass. Accordingly, sealing performance for preventing water leakage or the like improves.

Furthermore, the second embodiment of the present invention is directed to a glass run, wherein the sub-lip comes into contact with the vehicle interior side of the first inner lip when the door glass comes into sliding contact with the first inner lip. When a space is formed between tips of the first inner lip and the sub-lip during sliding contact between the door glass and the first inner lip, Helmholtz resonance is generated by a narrow space between the tips of the first inner lip and the sub-lip, and a wide space formed by the first inner lip, the sub-lip, and the vehicle interior side wall other than the narrow space.

According to the second embodiment of the present invention, the sub-lip contacts the vehicle interior side of the first inner lip during sliding contact between the door glass and the first inner lip. Accordingly, generation of the foregoing Helmholtz resonance is avoidable by eliminating the space generated between the tips of the first inner lip and the sub-lip.

A third embodiment of the present invention is directed to a glass run, wherein a base portion that protrudes from the vehicle interior side wall toward the door glass is provided at least either at a root portion of the first inner lip and the vehicle exterior side wall, or at a root portion of the second inner lip and the vehicle exterior side wall.

According to the third embodiment of the present invention, the base portion that protrudes from the vehicle interior side wall toward the door glass is provided at least either at the root portion of the first inner lip and the vehicle exterior side wall, or at the root portion of the second inner lip and the vehicle exterior side wall. Accordingly, the protruded base portion further increases the transmitted sound insulation effect. In addition, each length of the inner lips itself can be further made smaller. Accordingly, a resonance point of the transmitted sound can be shifted to the high frequency side to prevent vibrations of each inner lip produced by the transmitted sound. As a result, generation of radiated sound by vibrations is avoidable on the vehicle interior side. Simultaneously, rigidity of the root portions of the inner lips increases.

A fourth embodiment of the present invention of is directed to a glass run, wherein a recess is formed in a bottom wall side upper part of the base portion. The base portion is formed at the root portions of the inner lips. In this case, each length of the inner lips itself is further made smaller, and the inner lips are less likely to bend when the inner lips come into sliding contact with the door glass. According to the fourth embodiment of the present invention, the recess is formed in the bottom wall side upper part of the base portion. In this case, the inner lips easily fall toward the bottom wall with starting points located at the recess when the inner lips come into sliding contact with the door glass. Accordingly, followability to the door glass improves. As a result, smooth sliding contact between the inner lips and the door glass is achievable while maintaining the increased effect of transmitted sound insulation.

The glass run includes at least the first inner lip, and the second inner lip formed at a position closer to the bottom wall than the first inner lip is. In the configuration where the plurality of inner lips are provided, the transmitted sound insulation effect in the glass run transmission route B increases.

In addition, in the configuration where the plurality of inner lips are provided, each length of the inner lips can be made smaller than a length of a conventional inner lip. Accordingly, a resonance point of the transmitted sound can be shifted to the high frequency side to prevent vibrations of each inner lip produced by the transmitted sound. As a result, generation of radiated sound by vibrations is avoidable on the vehicle interior side.

Furthermore, the first inner lip and the second inner lip extend toward the bottom wall, and do not contact each other during sliding contact with the door glass. Accordingly, the inner lips do not interfere with each other, thereby allowing smooth sliding contact with the door glass, and maintaining original sealing performance of the inner lips for the door glass.

BRIEF DESCRIPTION OF THE DRAWINGS

FIG. 7A is a schematic diagram showing an evaluation method, while

DETAILED DESCRIPTION OF PREFERRED EMBODIMENTS

Figure 1:
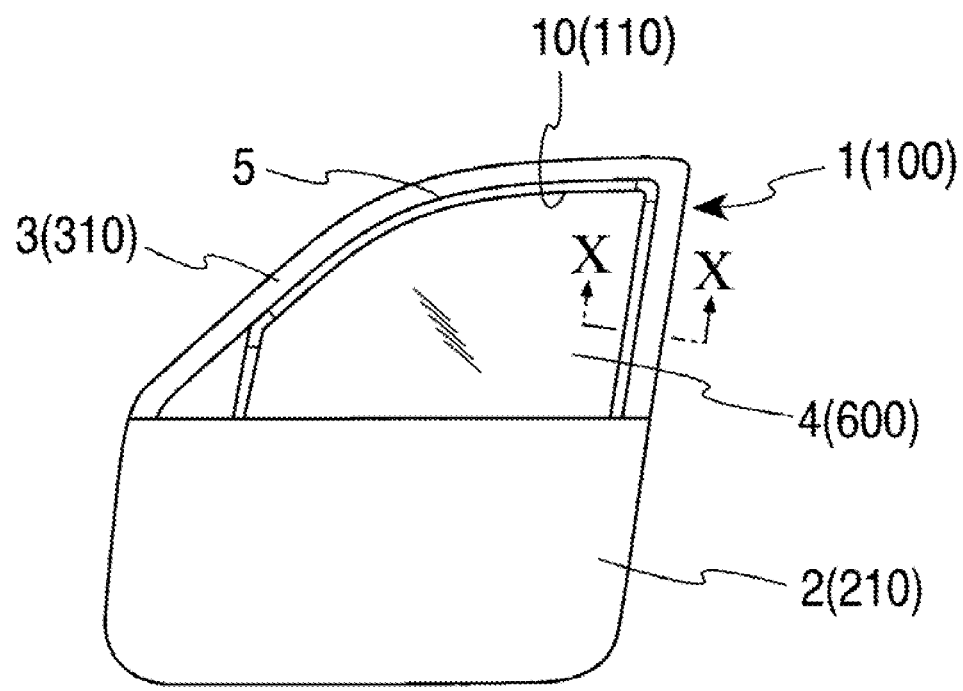
FIG. 1 is a side view of an automobile door.

A first embodiment of the present invention will be described with reference to FIGS. 1 to 3. FIG. 1 is a front view of a front door 1 on the left side of an automobile as viewed from the outside of the vehicle. A door frame 3 is mounted on an upper part of a door body 2 which constitutes the front door 1. A window opening is formed by the door frame 3 and an upper edge of the door body 2. A glass run 10 is attached to an inner peripheral edge of the window opening and inside the door body 2 to guide upward and downward movement of door glass 4. Note that the present invention is applicable not only to the front door 1 on the left side, but also to a front door on the right side and rear doors on the left and right sides. The present invention is also applicable to a sliding door which moves door glass upward and downward.

Figure 2:
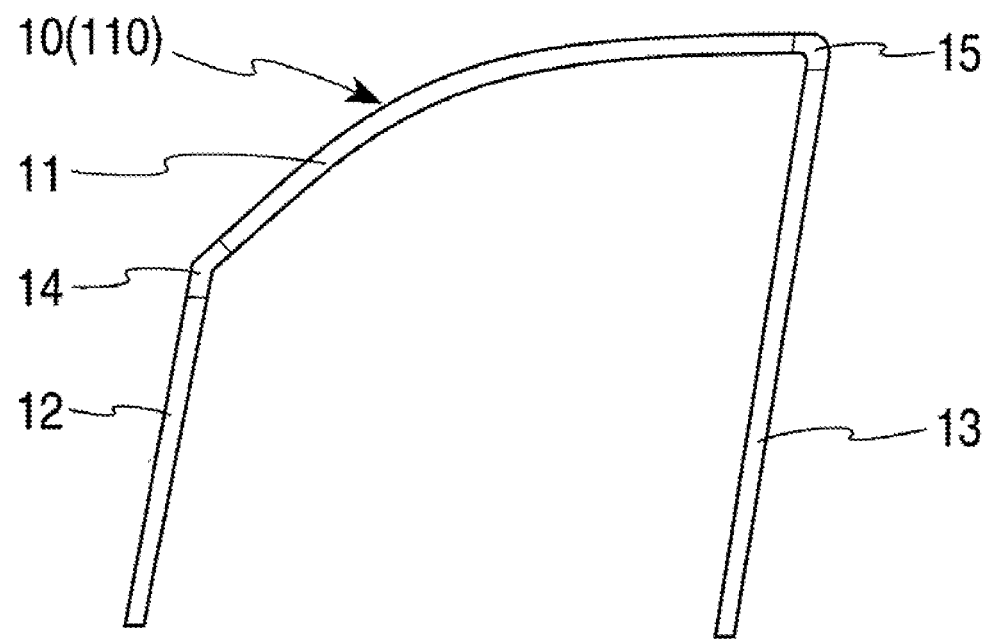
FIG. 2 is a front view showing a glass run included in a door frame in FIG. 1.

FIG. 2 is a front view showing only the glass run 10 in a simplified manner as viewed from the outside of the vehicle. The glass run 10 is constituted by a first extrusion molding portion 11 corresponding to a horizontal frame portion of the door frame 3, a second extrusion molding portion 12 corresponding to a front vertical frame portion of the front door 1, and a third extrusion molding portion 13 corresponding to a rear vertical frame portion. A front end of the first extrusion molding portion 11 is connected to an upper end of the second extrusion molding portion 12 by a first mold forming portion 14. A rear end of the first extrusion molding portion 11 is connected to an upper end of the third extrusion molding portion 13 by a second mold forming portion 15.

Figure 3:
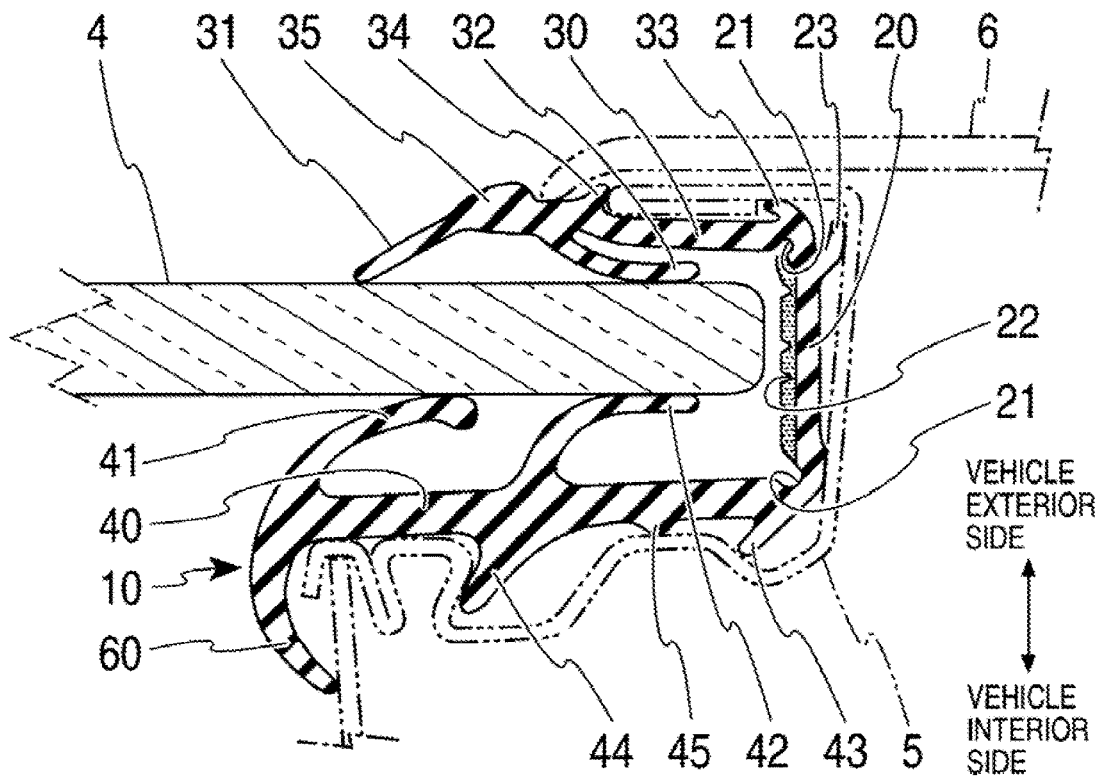
FIG. 3 is a cross-sectional view showing a glass run according to a first embodiment of the present invention, and corresponds to a cross section taken along a line X-X in FIG. 1.

FIG. 3 is a cross-sectional view of the rear vertical frame portion of the door frame 3, and corresponds to a cross section taken along a line X-X in FIG. 1. The glass run 10 has a channel shape (substantially C-shaped cross section), and has a basic frame constituted by a bottom wall 20, a vehicle exterior side wall 30, and a vehicle interior side wall 40. Connecting portions between the bottom wall 20, the vehicle exterior side wall 30, and the vehicle interior side wall 40 are connected by grooves 21 on the vehicle exterior side and the vehicle interior side in a deployable manner in a free state. The vehicle interior side wall 40 has a size and a wall thickness larger than those of the vehicle exterior side wall 30, producing such an asymmetric shape that the vehicle interior side is larger.

The bottom wall 20 has a substantially plate shape. An inner surface of the bottom wall 20 (the contact side with the door glass 4) has a plurality of bottom wall recesses 22 continuously formed in parallel in the longitudinal direction. Moreover, a bottom wall seal lip 23 is provided on an outer surface of the bottom wall 20. The bottom wall seal lip 23 contacts the door channel 5 to seal between the bottom wall 20 and the door channel 5.

A second outer lip 32 in contact with the door glass 4 and extending toward the bottom wall 20 is provided on the vehicle interior side of the vehicle exterior side wall 30. A first outer lip 31 extending toward the side opposite to the second outer lip 32 is provided at a tip portion of the vehicle exterior side wall 30. The first outer lip 31 provides double sealing of the vehicle exterior side surface of the door glass 4 in cooperation with the second outer lip 32.

A first vehicle exterior side holding lip 33 and a second vehicle exterior side holding lip 34 locked to the door channel 5 are provided on the vehicle exterior side of the vehicle exterior side wall 30 near a connecting portion with the bottom wall 20 and in a direction toward the tip of the vehicle exterior side wall 30, respectively. The door channel 5 which is bent is held by the first vehicle exterior side holding lip 33 and the second vehicle exterior side holding lip 34. A locking portion 35 extending toward the vehicle exterior side is provided at a root portion of the first outer lip 31 to fix an end of a pillar garnish 6 and seal a gap between the pillar garnish 6 and a surface of the vehicle exterior side wall 30.

A second inner lip 42 in contact with the door glass 4 and extending toward the bottom wall 20 is provided on the vehicle exterior side of the vehicle interior side wall 40. A first inner lip 41 in contact with the door glass 4 and extending toward the bottom wall 20 is provided at a tip portion of the vehicle interior side wall 40. The second inner lip 42 is provided such that the vehicle exterior side of the second inner lip 42 and the vehicle interior side of the first inner lip 41 do not come into contact with each other during sliding contact with the door glass 4.

A first vehicle interior side holding lip 43 and a second vehicle interior side holding lip 44 locked to a curved portion of the door channel 5 having the curved portion are provided on the vehicle interior side of the vehicle interior side wall 40 near the connecting portion with the bottom wall 20 and in a direction toward the tip of the vehicle interior side wall 40, respectively. A contact lip 45 is provided between the first vehicle interior side holding lip 43 and the second vehicle interior side holding lip 44. The vehicle interior side wall 40 is held by the curved door channel 5 via the first vehicle interior side holding lip 43, the second vehicle interior side holding lip 44, and the contact lip 45.

A cover lip 60 is provided at a tip of the vehicle interior side wall 40 on the side opposite to the first inner lip 41 (vehicle interior side). While the figure shows the cover lip 60 shaped to be continuous from the first inner lip 41, the present invention is not limited to this example. The cover lip 60 contacts the door channel 5 and seals a gap of the vehicle interior side wall 40.

Accordingly, the glass run 10 includes a plurality of lips, i.e., the first inner lip 41, and the second inner lip 42 formed at a position closer to the bottom wall 20 than the first inner lip 41 is. In this case, a transmitted sound insulation effect in the glass run transmission route B increases. While the two inner lips constituted by the first inner lips 41 and the second inner lips 42 are provided in FIG. 3, the number of the inner lips may be larger.

Figure 8:
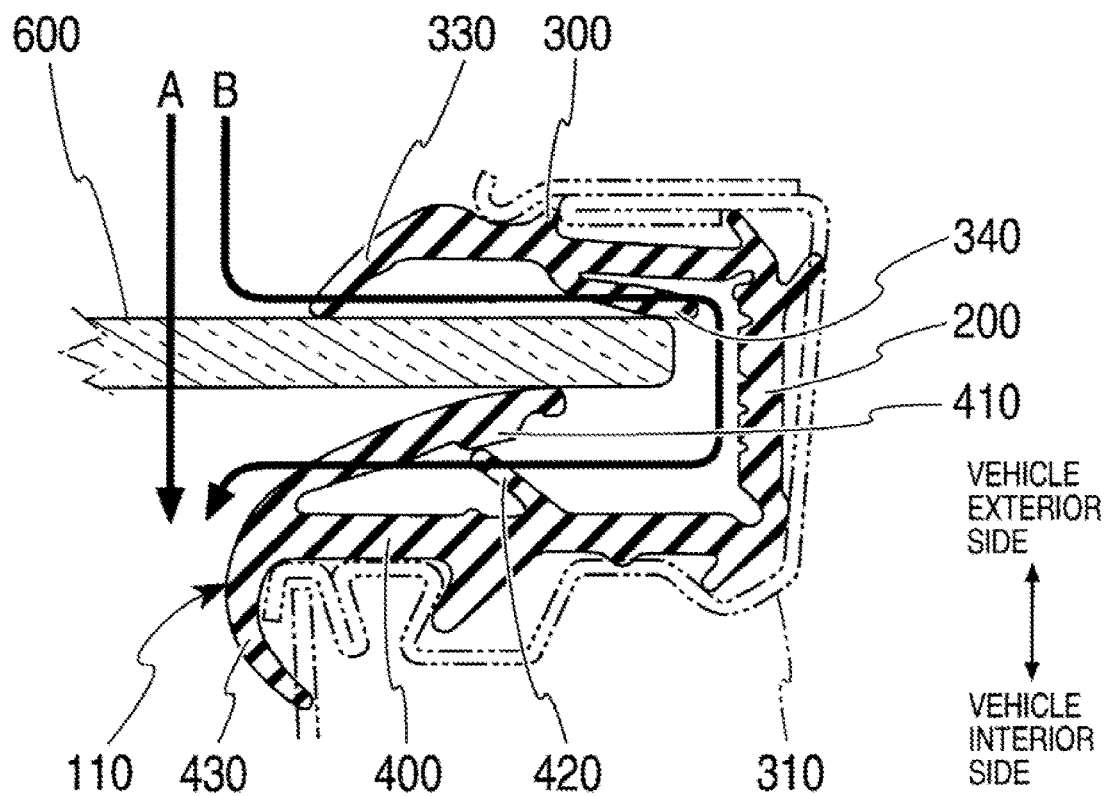
FIG. 8 is a cross-sectional view showing an attachment structure of the conventional glass run, and corresponds to a cross section taken long the line X-X in FIG. 1 (JP 2018-149984 A)
Figure 9:
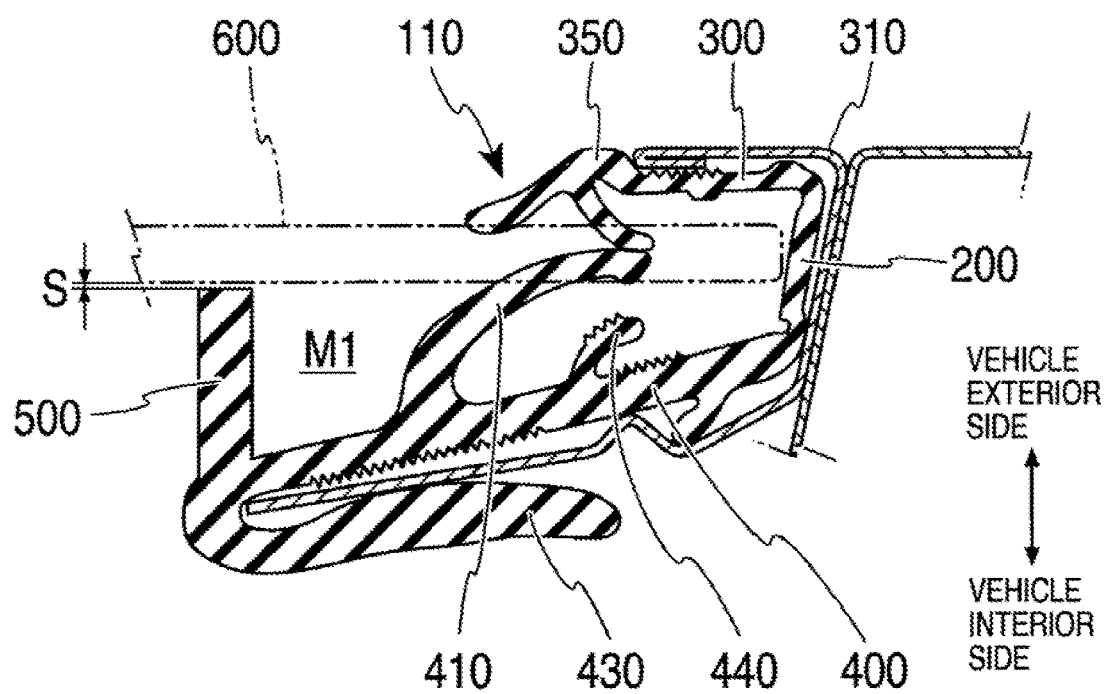
FIG. 9 is a cross-sectional view showing an attachment structure of a conventional glass run (JP 2016-222232 A).

In addition, in the configuration where the plurality of inner lips are provided, each length of the first inner lip 41 and the second inner lip 42 can be made smaller than the length of the conventional inner lip 410 (FIGS. 8 and 9). Accordingly, a resonance point of transmitted sound can be shifted to the high frequency side to prevent vibrations of each inner lip produced by the transmitted sound. As a result, generation of radiated sound by vibrations is avoidable on the vehicle interior side.

As shown in FIG. 3, the first inner lip 41 herein is provided such that the tip of the first inner lip 41 and a vicinity of this tip come into sliding contact with the door glass 4 (point seal). The second inner lip 42 is provided such that a wide range in a direction from a tip portion toward a root portion of the second inner lip 42 comes into sliding contact with the door glass 4 (face seal). The second inner lip 42 is thus configured to increase a contact area with the door glass 4 chiefly for the purpose of improving NV (Noise, Vibration) characteristics, while the first inner lip 41 is thus configured to simultaneously improve prevention of water leakage and the like and insulation of transmitted sound. Accordingly, a front end portion of the first inner lip 41 has a large thickness on the vehicle interior side.

Figure 4:
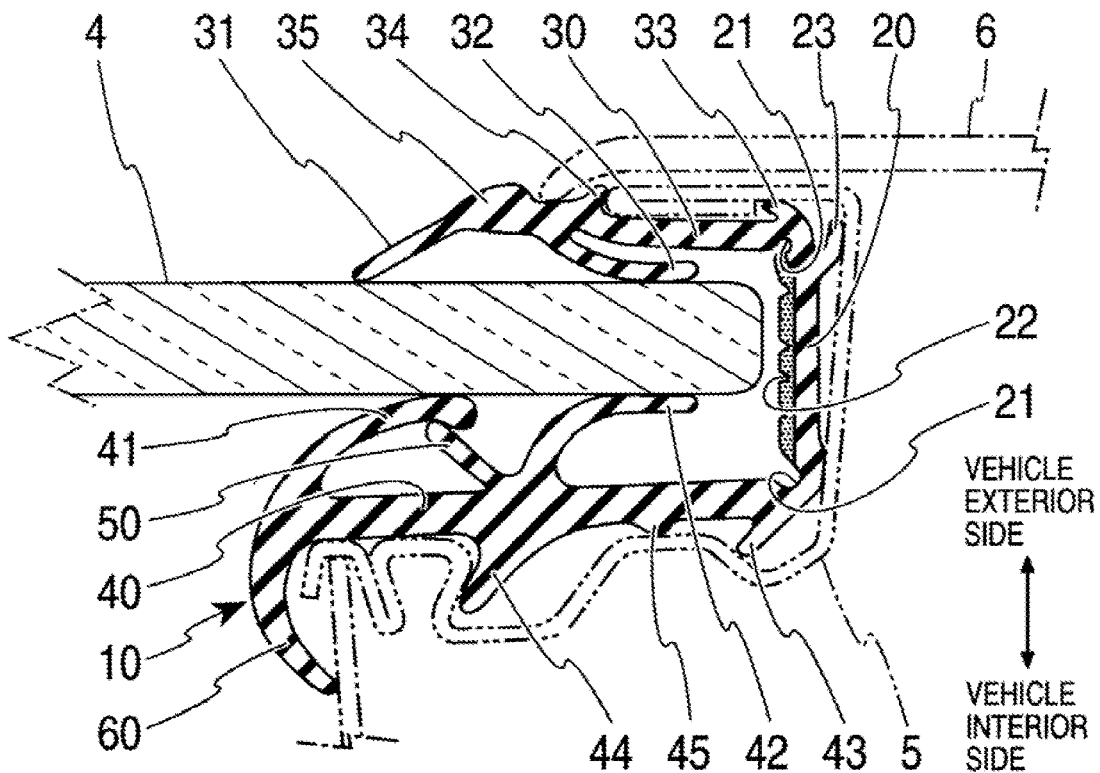
FIG. 4 is a cross-sectional view showing a glass run according to a second embodiment of the present invention, and corresponds to the cross section taken along the line X-X in FIG. 1.

FIG. 4 shows a second embodiment of the present invention, and includes, in addition to the configuration of the first embodiment, a sub-lip 50 which obliquely protrudes from a first inner lip 41 side root portion of the second inner lip 42 toward a root portion side surface of the first inner lip 41 in a direction away from the bottom wall 20. The sub-lip 50 is so provided as to come into contact with the vehicle interior side of the first inner lip 41 when the door glass 4 comes into sliding contact with the first inner lip 41. Note that the sub-lip 50 may be provided on the vehicle interior side wall 40 at a position closer to the first inner lip 41 than to the second inner lip 42.

In this case, the sub-lip 50 thus added further increases the transmitted sound insulation effect. Moreover, the sub-lip 50 pushes a back surface of the first inner lip 41 and thus increases a pressure contact force applied by the first inner lip 41 to the door glass 4 when the first inner lip 41 comes into sliding contact with the door glass 4. Accordingly, sealing performance for preventing water leakage or the like improves.

Furthermore, the sub-lip 50 contacts the vehicle interior side of the first inner lip 41 when the door glass 4 comes into sliding contact with the first inner lip 41. Accordingly, a space is not formed between tips of the first inner lip 41 and the sub-lip 50. This configuration prevents Helmholtz resonance generated by a narrow space between the tips of the first inner lip 41 and the sub-lip 50, and a wide space formed by the sub-lip 50 and the vehicle interior side wall 40 in a case where a space is formed between the tips of the first inner lip 41 and the sub-lip 50 during sliding contact between the door glass 4 and the first inner lip 41.

Figure 5:
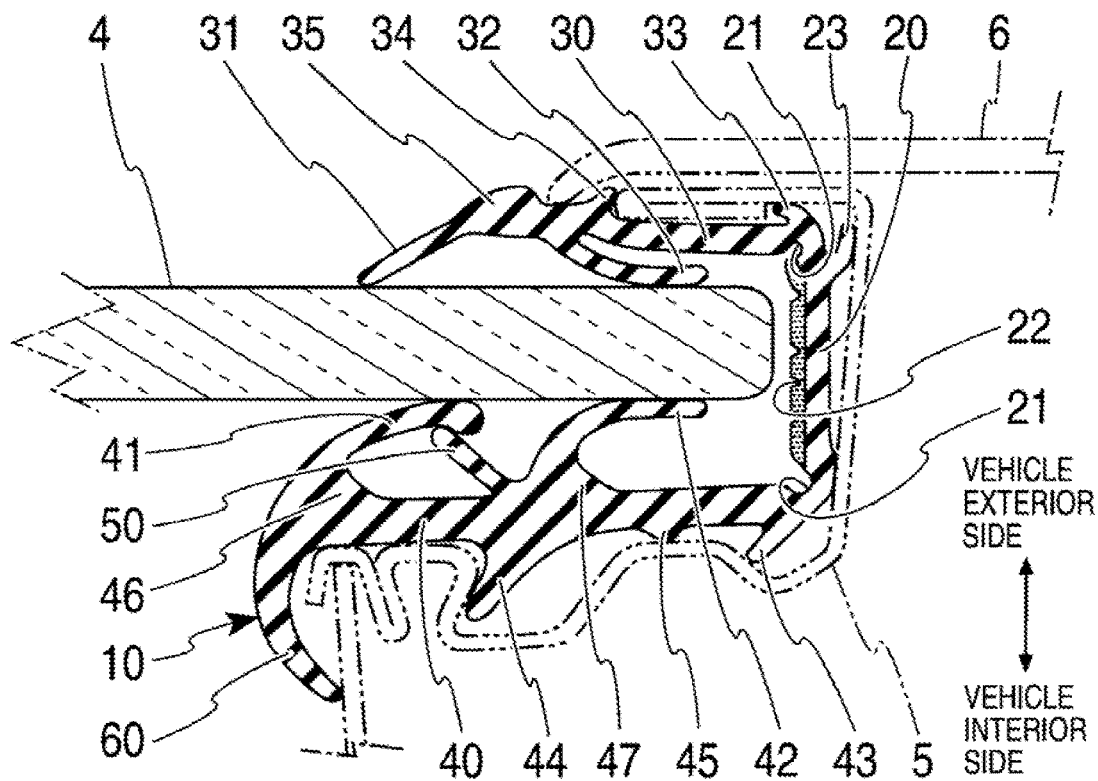
FIG. 5 is a cross-sectional view showing a glass run according to a third embodiment of the present invention, and corresponds to the cross section taken along the line X-X in FIG. 1.

FIG. 5 shows a third embodiment of the present invention, and includes a base portion 46 and a base portion 47 protruding from the vehicle interior side wall 40 toward the door glass 4 are provided at a root portion of the first inner lip 41 and the vehicle interior side wall 40, and a root portion of the second inner lip 42 and the vehicle interior side wall 40, respectively, in the second embodiment described above. Note that one of the base portion 46 and the base portion 47 may be eliminated.

In this case, the protruding base portions further increase the transmitted sound insulation effect. In addition, each length of the first inner lip 41 and the second inner lip 42 can be made smaller than the corresponding length of the first embodiment. Accordingly, a resonance point of transmitted sound can be shifted to the high frequency side to prevent vibrations of each inner lip produced by the transmitted sound. As a result, generation of radiated sound by vibrations is avoidable on the vehicle interior side. Simultaneously, rigidity of the root portions of the first inner lip 41 and the second inner lip 42 increases.

Figure 6:
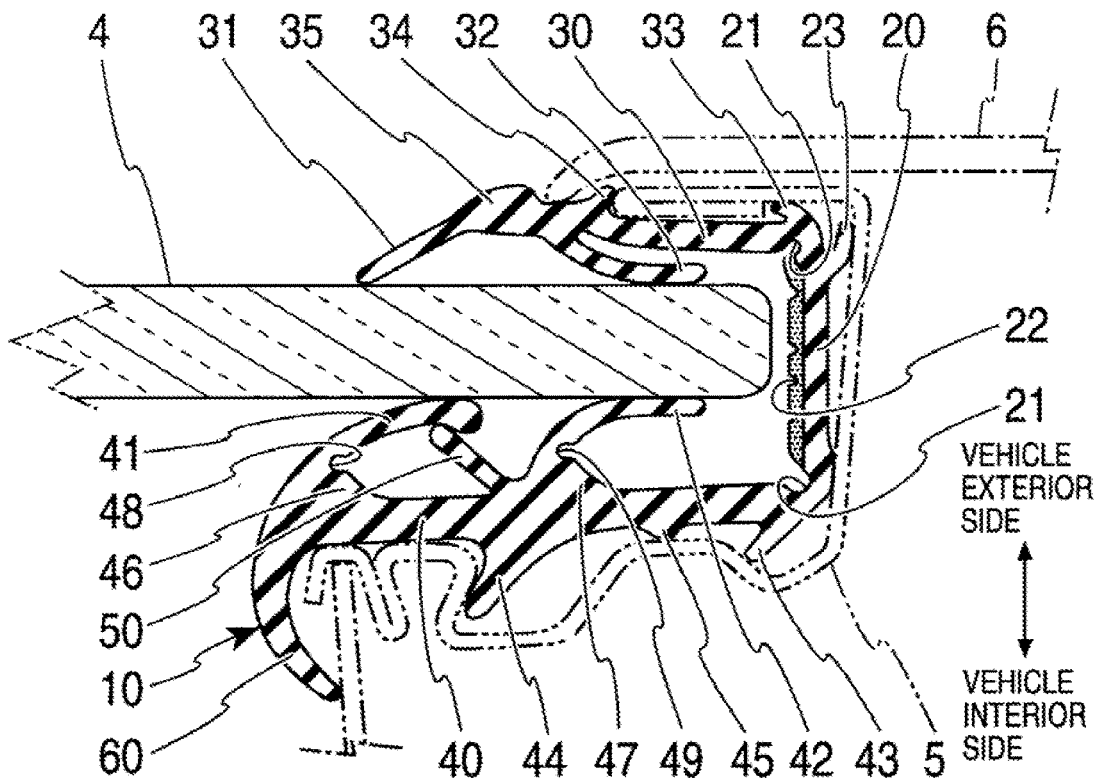
FIG. 6 is a cross-sectional view showing a glass run according to a fourth embodiment of the present invention, and corresponds to the cross section taken along the line X-X in FIG. 1.

FIG. 6 shows a fourth embodiment of the present invention, and includes a recess 48 and a recess 49 formed in bottom wall 20 side upper parts of the base portion 46 and the base portion 47, respectively, in the third embodiment. Note that one of the recess 48 and the recess 49 may be eliminated.

In this case, the first inner lip 41 and the second inner lip easily fall toward the bottom wall 20 with starting points located at the recesses 48 and 49 when the first inner lip 41 and the second inner lip 42 come into sliding contact with the door glass 4. Accordingly, followability of the first inner lip 41 and the second inner lip 42 to the door glass 4 improves. As a result, smooth sliding contact with the door glass 4 is achievable while maintaining the increased effect of transmitted sound insulation in the third embodiment.

Figure 7A:
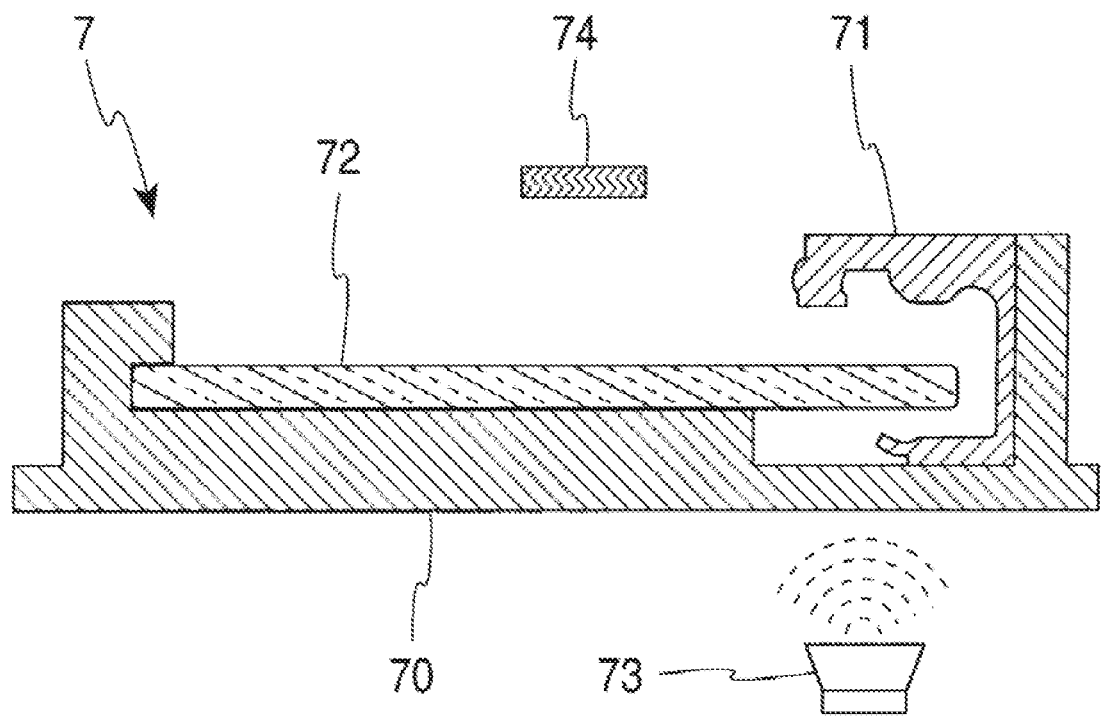

FIG. 7A is a schematic diagram of an evaluation method for checking a sound insulation effect of the glass run 10 of the above embodiments concerning the glass run transmission route B. A measuring jig 7 is constituted by a base 70 on which an iron plate 72 is placed, the iron plate 72, and a door frame jig 71 attached to the base 70. A speaker 73, which is a sound source, is provided below the measuring jig 7, and a sound receiving microphone 74 is provided above the measuring jig 7.

The measuring jig 7 configured as above simulates a peripheral structure of the glass run 10 in a state attached to the door frame 3 provided on the door body 2 of an actual vehicle. The iron plate 72 used herein has the same thickness as that of the door glass 4.

Octave analysis is adopted for analysis because this analysis has proportional frequency characteristics perceived by a human ear. A sound pressure level for each band is measured through a bandpass filter determined by ⅓ octave specifications in a frequency range of audible frequencies of noise. In addition, a difference between sound pressure levels of respective frequencies is calculated as an insertion loss (dB) in a case where the glass run 10 is mounted on the door frame jig 71 and in a case where the glass run 10 is not mounted. Accordingly, a larger insertion loss (dB) indicates a larger sound insulation effect. Refer to JIS C 1513: 2002 for characteristics of the bandpass filter and the like.

Figure 7B:
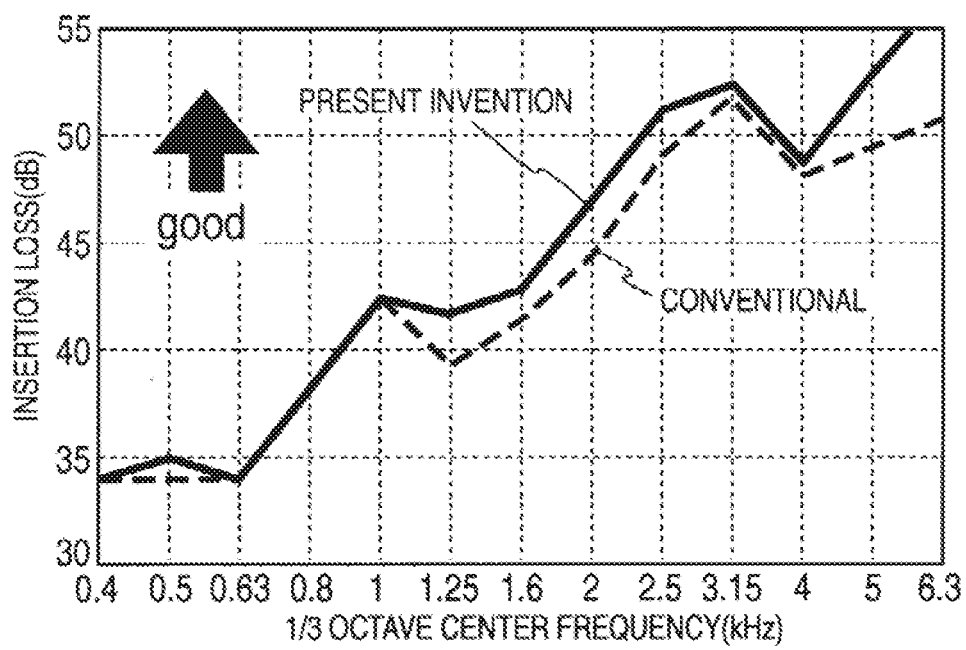
FIG. 7B is a graph showing a relationship between a frequency and an insertion loss near a cross section of the glass run of the third embodiment of the present invention shown in FIG. 5, and a corresponding relationship of a conventional glass run shown in FIG. 8.

FIG. 7B shows a comparison between a relationship between a frequency and an insertion loss in the case of the conventional glass run 110 shown in FIG. 8 (broken line), and that relationship in the case of the glass run 10 of the third embodiment (FIG. 5) (solid line). As apparent from FIG. 7B, a remarkable effect is produced by the present invention particularly in a range from 1 kHz to 3.15 kHz and exceeding 4 kHz. It has been confirmed that a larger sound insulation effect than that of the conventional glass run 110 is similarly produced by the other embodiments described above.

In the embodiments of the present invention, examples of the material forming the glass run 10 include rubber, thermoplastic elastomer, soft synthetic resin, and the like. It is preferable to select EPDM (ethylene propylene diene rubber) as rubber, and olefinic thermoplastic elastomer (TPO) or dynamically crosslinked thermoplastic elastomer (TPV) as thermoplastic elastomer from viewpoints of weather resistance, recycling, cost, and the like.

As described above, the sound insulation effect of the glass run transmission route B also increases when the glass run 10 of the present invention is mounted. Accordingly, noise from the outside or the like can be also effectively insulated during traveling with an electric motor, such as traveling by an electric vehicle and a hybrid vehicle.

The present invention is not limited to the embodiments described above, but may be modified in various ways without departing from the object of the present invention.

While the third extrusion molding portion 13 corresponding to the rear vertical frame portion of the door frame 3 has been described concerning the glass run 10 of the above embodiments, the above description is applicable to the second extrusion molding portion 12 corresponding to the front vertical side portion of the door frame 3 having a different cross-sectional shape, the first extrusion molding portion 11 corresponding to the horizontal frame portion, the first mold forming portion 14, and the second mold forming portion 15.

What is claimed is:

1. A glass run attached to a groove formed in a door frame, the glass run comprising:
   a basic frame including a bottom wall, a vehicle exterior side wall, and a vehicle interior side wall;
   an outer lip provided on the vehicle exterior side wall and coming into sliding contact with the vehicle exterior side of door glass; and
   an inner lip provided on the vehicle interior side wall and coming into sliding contact with the vehicle interior side of the door glass,
   wherein
   the inner lip includes at least a first inner lip, and a second inner lip provided at a position closer to the bottom wall than the first inner lip is, and
   each of the first inner lip and the second inner lip extends toward the bottom wall, and does not come into contact with each other during sliding contact with the door glass, and
   a sub-lip that obliquely protrudes from a first inner lip side root portion of the second inner lip or the vehicle interior side wall toward a root portion side surface of the first inner lip is provided between the first inner lip and the second inner lip.

2. The glass run according to claim 1, wherein the sub-lip comes into contact with the vehicle interior side of the first inner lip when the door glass comes into sliding contact with the first inner lip.

3. The glass run according to claim 1, wherein a base portion that protrudes from the vehicle interior side wall toward the door glass is provided at least either at a root portion of the first inner lip and the vehicle interior side wall, or at a root portion of the second inner lip and the vehicle interior side wall.

4. The glass run according to claim 3, wherein a recess is formed in a bottom wall side upper part of the base portion.

* * * * *